US011898791B2

(12) United States Patent
Kapure et al.

(10) Patent No.: US 11,898,791 B2
(45) Date of Patent: Feb. 13, 2024

(54) APPLIANCE DOOR GASKET ASSEMBLY

(71) Applicant: WHIRLPOOL CORPORATION, Benton Harbor, MI (US)

(72) Inventors: Narendra A. Kapure, Pune (IN); Abhay Naik, Stevensville, MI (US); Sanjesh Kumar Pathak, Stevensville, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 459 days.

(21) Appl. No.: 16/870,399

(22) Filed: May 8, 2020

(65) Prior Publication Data

US 2021/0348831 A1 Nov. 11, 2021

(51) Int. Cl.

*F25D 23/02* (2006.01)
*F25D 23/08* (2006.01)
*E05C 19/16* (2006.01)

(52) U.S. Cl.

CPC .......... *F25D 23/087* (2013.01); *F25D 23/02* (2013.01); *F25D 23/082* (2013.01); *F25D 23/085* (2013.01); *E05C 19/161* (2013.01); *F25D 23/028* (2013.01)

(58) Field of Classification Search

CPC . E05Y 2900/31; F25D 23/087; F25D 23/085; F25D 23/082; F25D 23/02; F25D 23/028; E05C 19/161

See application file for complete search history.

(56) References Cited

U.S. PATENT DOCUMENTS

| | | | |
|---|---|---|---|
| 4,509,292 A | 4/1985 | Konle | |
| 4,916,864 A | 4/1990 | Thompson | |
| 5,289,657 A | 3/1994 | Kiel | |
| 6,804,915 B2 | 10/2004 | Holmqvist | |
| 8,104,228 B2 | 1/2012 | Merla et al. | |
| 8,240,091 B2 | 8/2012 | Cittadini et al. | |
| 9,121,635 B2 | 9/2015 | Mentasti et al. | |
| 9,879,900 B1 * | 1/2018 | Ammerman | F25D 23/04 |

(Continued)

FOREIGN PATENT DOCUMENTS

| | | |
|---|---|---|
| DE | 3525539 C1 | 11/1986 |
| EP | 3623731 A1 | 3/2020 |

(Continued)

*Primary Examiner* — Kimberley S Wright
(74) *Attorney, Agent, or Firm* — Price Heneveld LLP

(57) ABSTRACT

A refrigerator appliance includes a cabinet defining a compartment. A door is hingedly coupled with the cabinet and is configured to selectively seal the compartment. The door includes a door trim breaker. An engagement member extends from the door trim breaker. A first retention ridge extends from a first side of the engagement member, and a second retention ridge extends from a second side of the engagement member. The first retention ridge is offset from the second retention ridge. A gasket is configured to fit over the engagement member and includes a coupling portion defining first and second retention spaces. The first retention space is configured to receive the first retention ridge, and the second retention space is configured to receive the second retention ridge. A contact portion is integrally formed with the coupling portion and is configured to at least partially abut the cabinet when the door is closed.

20 Claims, 9 Drawing Sheets

(56) References Cited

U.S. PATENT DOCUMENTS

| | | | | |
|---|---|---|---|---|
| 10,234,194 | B2 * | 3/2019 | Hottmann | F25D 23/066 |
| 10,408,528 | B2 * | 9/2019 | Hurlebaus | F25D 23/087 |
| 10,563,905 | B1 * | 2/2020 | Allard | F25D 23/028 |
| 10,837,697 | B2 * | 11/2020 | Amorim | F25D 23/085 |
| 11,313,611 | B2 * | 4/2022 | Allard | F25D 23/02 |
| 11,320,193 | B2 * | 5/2022 | Visin | F25D 23/02 |
| 11,340,008 | B1 * | 5/2022 | Hunter | F25D 23/062 |
| 2018/0266750 | A1 * | 9/2018 | Hurlebaus | F25D 23/087 |
| 2018/0266754 | A1 * | 9/2018 | Hottmann | F25D 25/025 |
| 2019/0128591 | A1 * | 5/2019 | Visin | F25D 23/02 |
| 2020/0132359 | A1 * | 4/2020 | Amorim | F25D 23/067 |
| 2020/0348072 | A1 * | 11/2020 | Allard | F25D 23/02 |
| 2021/0025646 | A1 * | 1/2021 | Amorim | B29C 45/0001 |

FOREIGN PATENT DOCUMENTS

| | | | | |
|---|---|---|---|---|
| EP | 3647696 | A1 | | 6/2020 |
| JP | 2000154968 | A | * | 6/2000 |
| JP | 2002022349 | A | * | 1/2002 |

* cited by examiner

APPLIANCE DOOR GASKET ASSEMBLY

FIELD OF DISCLOSURE

The present disclosure generally relates to a gasket assembly, and more specifically, to a gasket assembly for an appliance door.

BACKGROUND

Door assemblies are commonly coupled with appliances and are sealed by gasket assemblies. An improved gasket assembly is disclosed herein.

SUMMARY OF THE DISCLOSURE

According to one aspect of the present disclosure, a refrigerator appliance includes a cabinet that defines a compartment. A door is hingedly coupled with the cabinet and is configured to selectively seal the compartment. The door includes a door trim breaker. An engagement member extends from the door trim breaker. A first retention ridge extends from a first side of the engagement member, and a second retention ridge extends from a second side of the engagement member. The first retention ridge is offset from the second retention ridge. A gasket is configured to fit over the engagement member. The gasket includes a coupling portion that defines a first retention space and a second retention space. The first retention space is configured to receive the first retention ridge, and the second retention space is configured to receive the second retention ridge. A contact portion is integrally formed with the coupling portion and is configured to at least partially abut the cabinet when the door is closed.

According to another aspect of the present disclosure, a refrigerator appliance includes a cabinet that defines a compartment. The compartment is accessible by a compartment opening. The compartment opening is defined by a compartment trim breaker. A door is configured to selectively seal the compartment and includes a door trim breaker operably coupled with a door liner. An engagement member extends from the door trim breaker. The engagement member has a first retention ridge extending from a first side of the engagement member and a second retention ridge extending from a second side of the engagement member. The first retention ridge is offset from the second retention ridge. An exterior gasket is operably coupled with the door trim breaker and is configured to abut the compartment trim breaker when the door is closed. An interior gasket is configured to fit over the engagement member. The interior gasket includes a coupling portion configured to snap-engage with the engagement member and a contact portion integrally formed with the coupling portion.

According to yet another aspect of the present disclosure, a gasket assembly for an appliance door includes a door trim breaker. The door trim breaker defines a gasket channel and includes an engagement member. The engagement member includes a first retention ridge extending from a first side of the engagement member and a second retention ridge extending from a second side of the engagement member. An exterior gasket includes an anchor. The anchor is positioned within the gasket channel and couples the exterior gasket with the door trim breaker. An interior gasket includes a coupling portion configured to snap-engage with the engagement member and a contact portion integrally formed with the coupling portion and extending toward the exterior gasket.

These and other features, advantages, and objects of the present disclosure will be further understood and appreciated by those skilled in the art by reference to the following specification, claims, and appended drawings.

Figure 1:
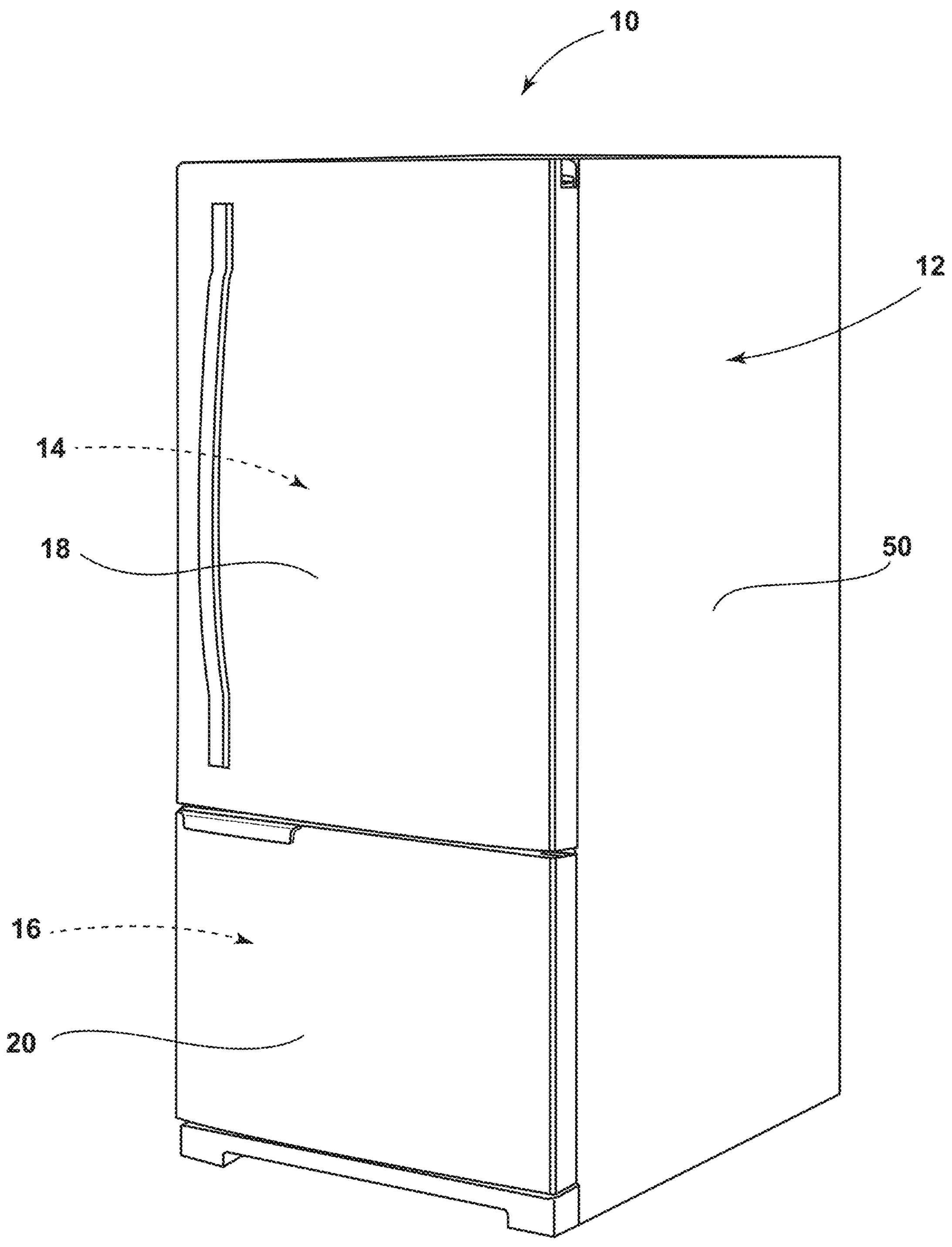
FIG. 1 is a side perspective view of a refrigerator appliance including an upper door and a lower door, according to various examples.

The components in the figures are not necessarily to scale, emphasis instead being placed upon illustrating the principles described herein.

DETAILED DESCRIPTION

The present illustrated embodiments reside primarily in combinations of method steps and apparatus components related to a gasket assembly for an appliance door. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms “upper,” “lower,” “right,” “left,” “rear,” “front,” “vertical,” “horizontal,” and derivatives thereof shall relate to the disclosure as oriented in FIG. 1. Unless stated otherwise, the term “front” shall refer to the surface of the element closer to an intended viewer, and the term “rear” shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms “including,” “comprises,” “comprising,” or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

Referring to FIGS. 1-8B, reference numeral 10 generally designates a refrigerator appliance. The refrigerator appliance 10 includes a cabinet 12 that defines a compartment 14, 16. A door 18, 20 is hingedly coupled with the cabinet 12 and is configured to selectively seal the compartment 14, 16. The door 18, 20 includes a door trim breaker 22. An engagement member 24 extends from the door trim breaker 22. A first retention ridge 26 extends from a first side 28 of the engagement member 24, and a second retention ridge 30 extends from a second side 32 of the engagement member 24. The first retention ridge 26 is offset from the second retention ridge 30. An interior gasket 34 is positioned interior of an outer edge of the door 20 and is configured to fit over the engagement member 24. The gasket 34 includes a coupling portion 36 that defines a first retention space 38 and a second retention space 40. The first retention space 38 is configured to receive the first retention ridge 26, and the second retention space 40 is configured to receive the second retention ridge 30. A contact portion 42 is integrally formed with the coupling portion 36 and is configured to at least partially abut the cabinet 12 when the door 20 is closed.

Figure 2:
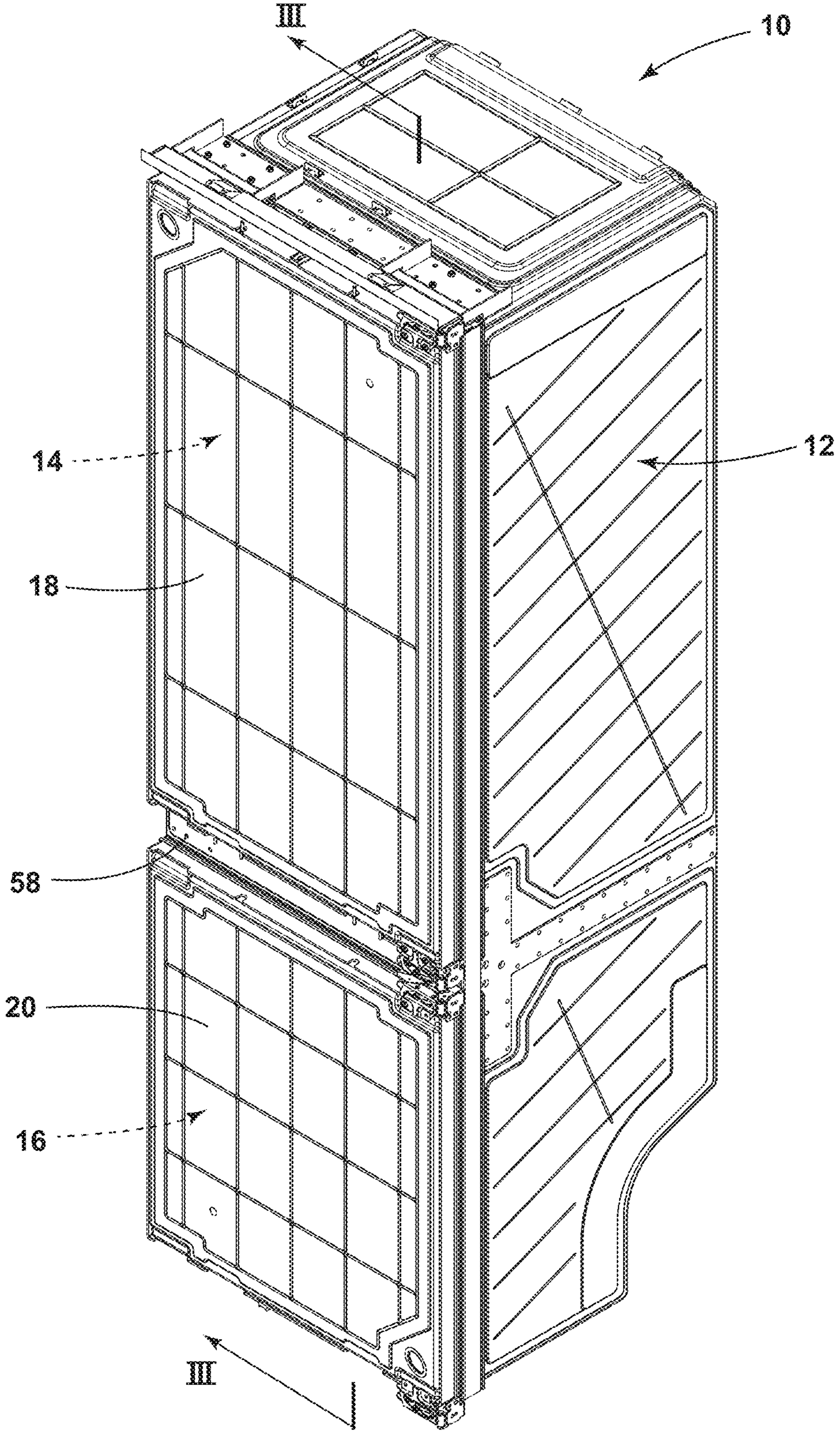
FIG. 2 is a side perspective view of a refrigerator appliance with a wrapper removed.
Figure 3:
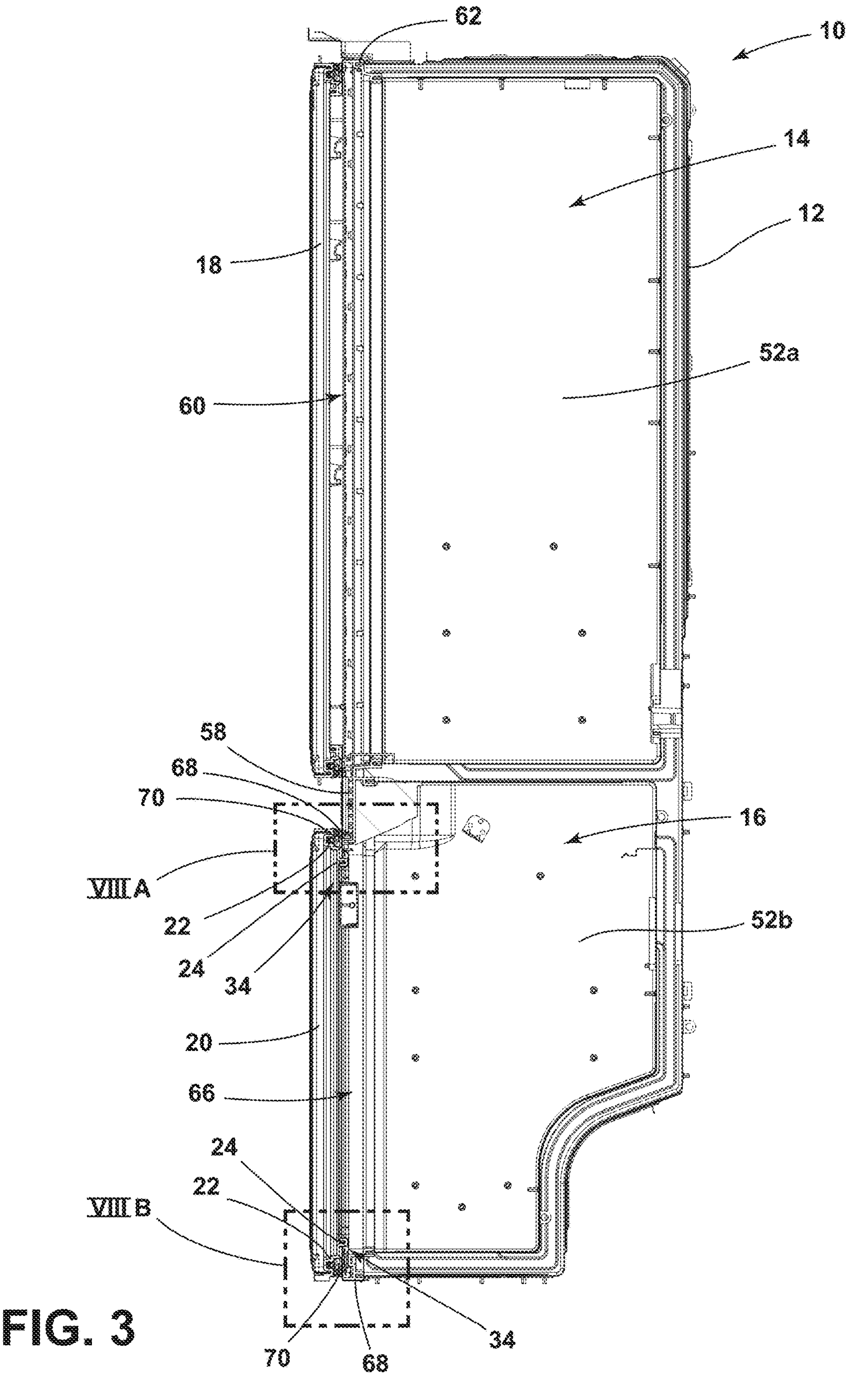
FIG. 3 is a cross-sectional view of the refrigerator appliance of FIG. 2 taken at line III-III.

Referring now to FIGS. 1-3, the refrigerator appliance 10 is illustrated including a cabinet 12 formed by an exterior wrapper 50 and one or more liners 52*a*, 52*b*. The cabinet 12 defines a refrigerator compartment 14 configured to refrigerate consumables and a freezer compartment 16 configured to freeze consumables during normal use. Accordingly, the refrigerator compartment 14 may be kept at a temperature above the freezing point of water and generally below a temperature of from about 35° F. to about 50° F., more typically below about 38° F. and the freezer compartment 16 may be kept at a temperature below the freezing point of water. A mullion 58 may separate the refrigerator compartment 14 and the freezer compartment 16. FIGS. 1 and 2 generally show a refrigerator of the bottom mount type with a swinging lower door, but it is understood that this disclosure could apply to any type of refrigerator, such as a side-by-side, French-door bottom mount, or top-mount refrigerator.

The refrigerator compartment 14 is selectively accessible via a refrigerator compartment opening 60 defined by a refrigerator compartment trim breaker 62, and the freezer compartment 16 is selectively accessible via a freezer compartment opening 66 defined by a freezer compartment trim breaker 68. The refrigerator compartment 14 is selectively sealed by a refrigerator compartment door 18, and the freezer compartment 16 is selectively sealed by a freezer compartment door 20. When the freezer compartment door 20 is closed, the freezer compartment door 20 is at least partially received by the freezer compartment opening 66. As illustrated in FIG. 3, the freezer compartment door 20 includes an exterior gasket 70 positioned along an exterior edge of the freezer compartment door 20 and an interior gasket 34 positioned interior of the exterior gasket 70. The interior and exterior gaskets 34, 70 are configured to seal the freezer compartment 16 when the freezer compartment door 20 is closed. However, it is contemplated that the refrigerator compartment door 18 may have the same or similar components without departing from the scope of the present disclosure.

Figure 4:
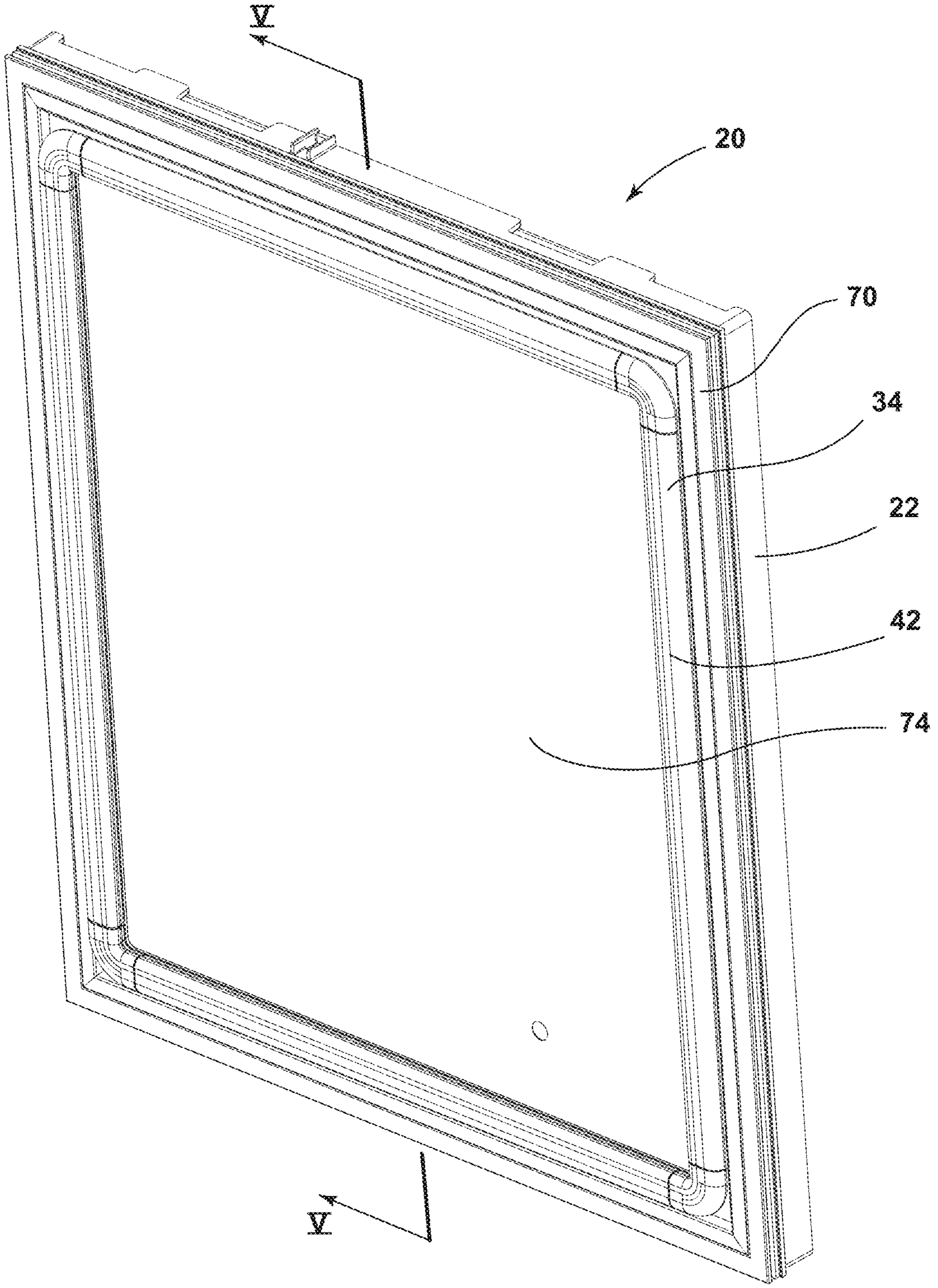
FIG. 4 is a rear perspective view of the lower door of FIG. 2.
Figure 5:
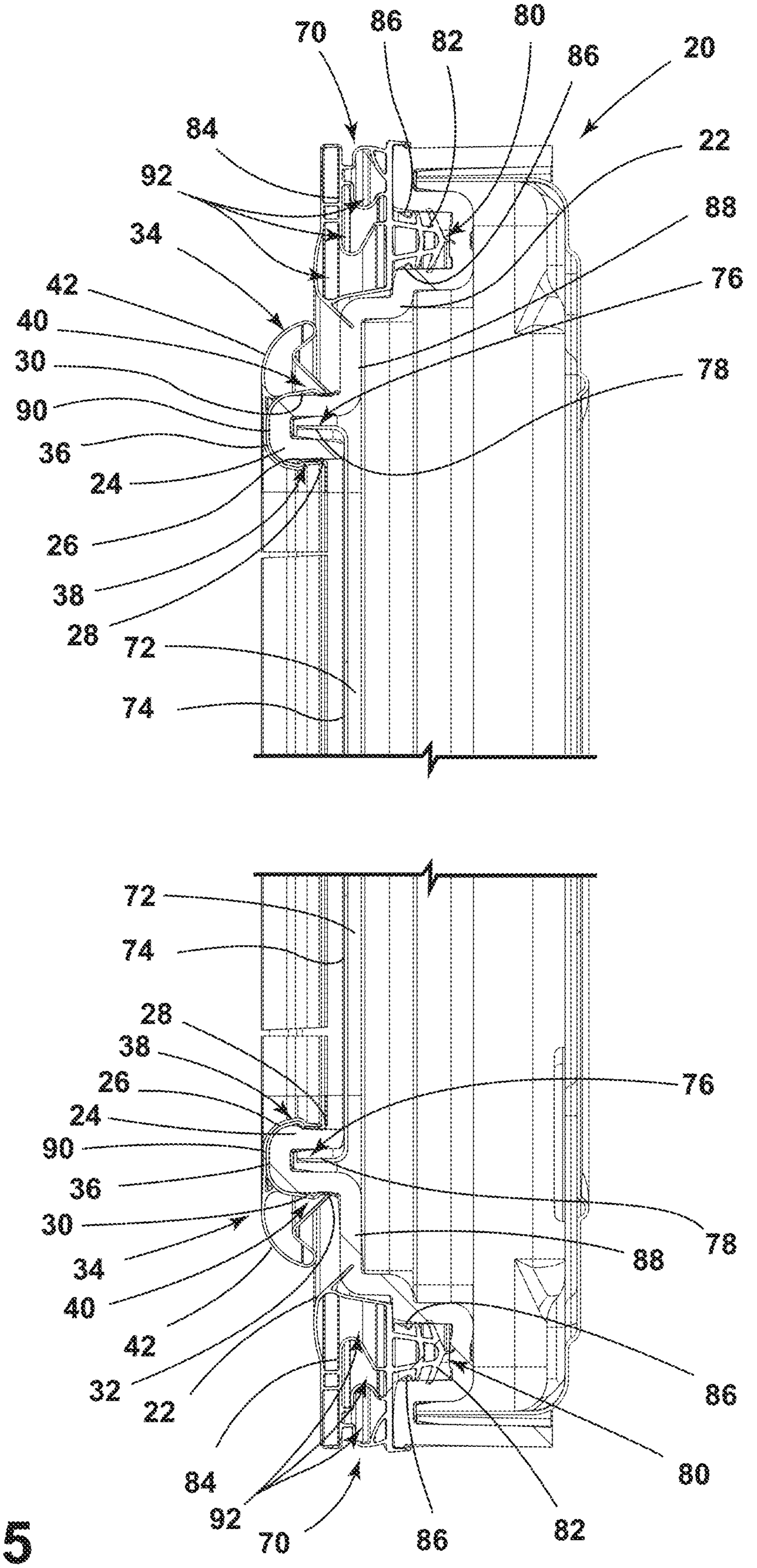
FIG. 5 is a cross-sectional segmented view of the lower door of FIG. 4 taken at line V-V.
Figure 6:
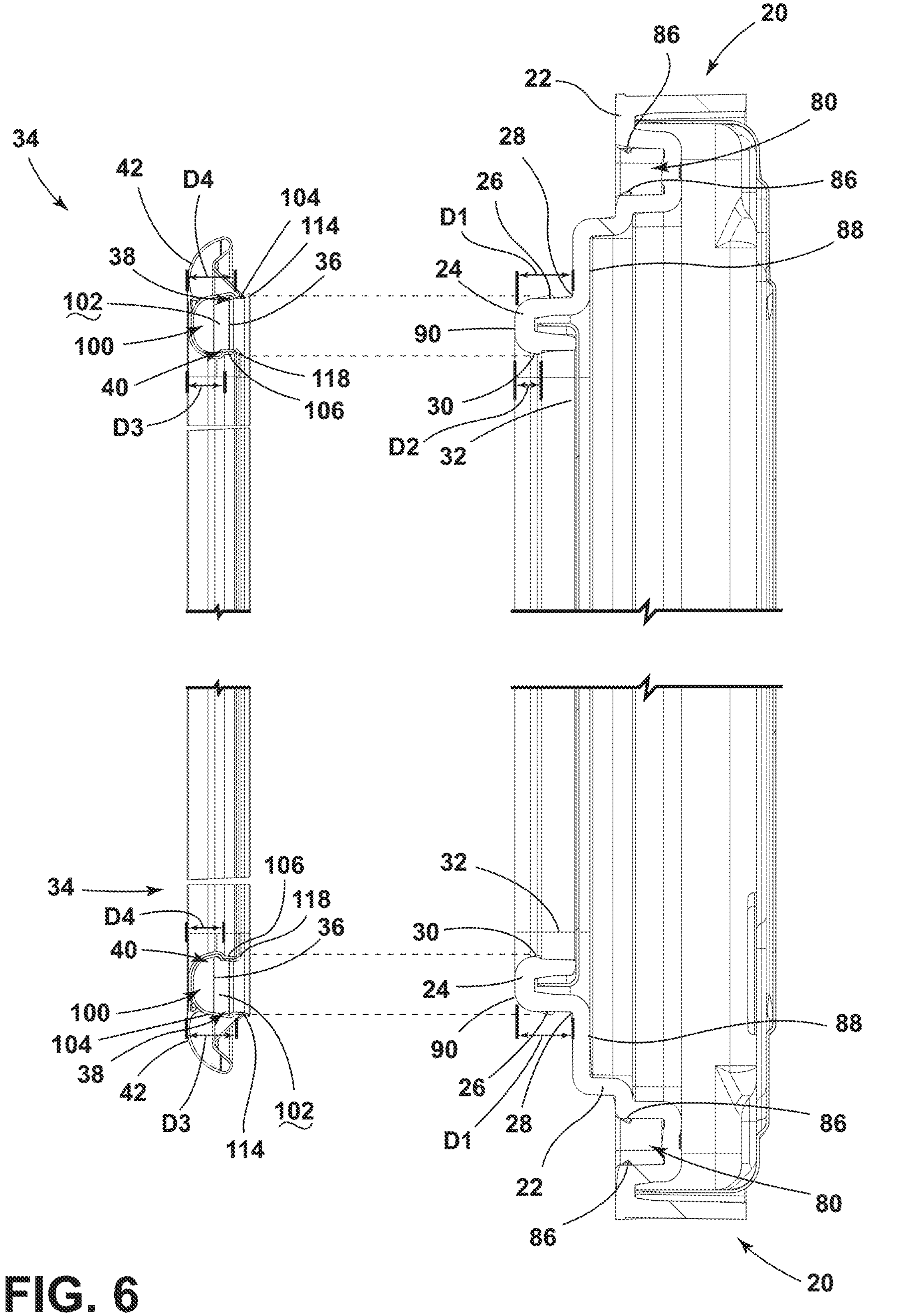
FIG. 6 is the cross-sectional segmented view of FIG. 4 with a gasket separated from the lower door.

Referring now to FIGS. 4-6, the freezer compartment door 20 includes the door trim breaker 22 extending along an outer periphery of the freezer compartment door 20. As best shown in FIGS. 5 and 6, the door trim breaker 22 extends from a body 72 of a door liner 74 and is operably coupled with the door liner 74. As illustrated, the door trim breaker 22 may define a slot 76 extending along the length of the door trim breaker 22 and configured to receive an inner peripheral edge 78 of the inner door liner 74. It will be understood that the door trim breaker 22 may have any number of connection points for coupling the door trim breaker 22 with various panels or liners of the freezer compartment door 20 without departing from the scope of the present disclosure.

Referring still to FIGS. 5 and 6, the door trim breaker 22 defines a gasket channel 80 extending about a periphery of the freezer compartment door 20. The gasket channel 80 may be defined exterior of the inner door liner 74 and is configured to receive an anchor 82 of the exterior gasket 70. A plurality of tabs 86 may be positioned within the gasket channel 80 and to retain the anchor 82 within the gasket channel 80. For example, each of the plurality of tabs 86 may extend from the door trim breaker 22 into the gasket channel 80. When the anchor 82 of the exterior gasket 70 is received by the gasket channel 80, a portion of the anchor 82 is prevented from inadvertent removal from the gasket channel 80 by the plurality of tabs 86. The engagement of the anchor 82 with the plurality of tabs 86 is configured to couple the exterior gasket 70 with the door trim breaker 22.

The exterior gasket 70 further includes a compressible portion 84 integrally formed with the anchor 82 and extending from the door trim breaker 22 when the anchor 82 is received by the gasket channel 80. The compressible portion 84 defines one or more spaces 92. When the freezer compartment door 20 is closed, the compressible portion 84 is compressed, as discussed in more detail elsewhere herein.

Figure 8A:
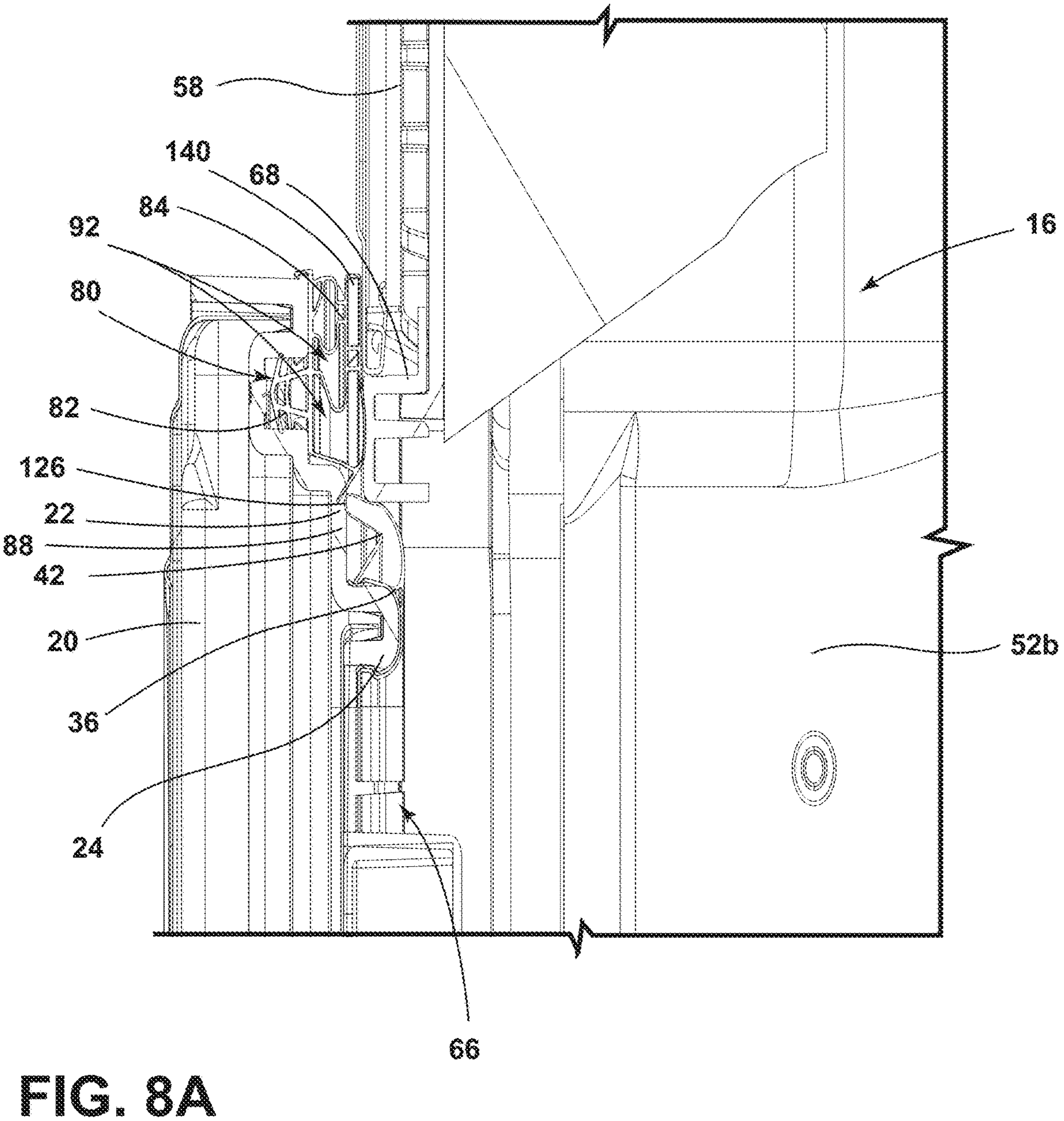
FIG. 8A is an enlarged view of area VIIIA of FIG. 3 and illustrates an upper portion of a gasket assembly of the lower door.
Figure 8B:
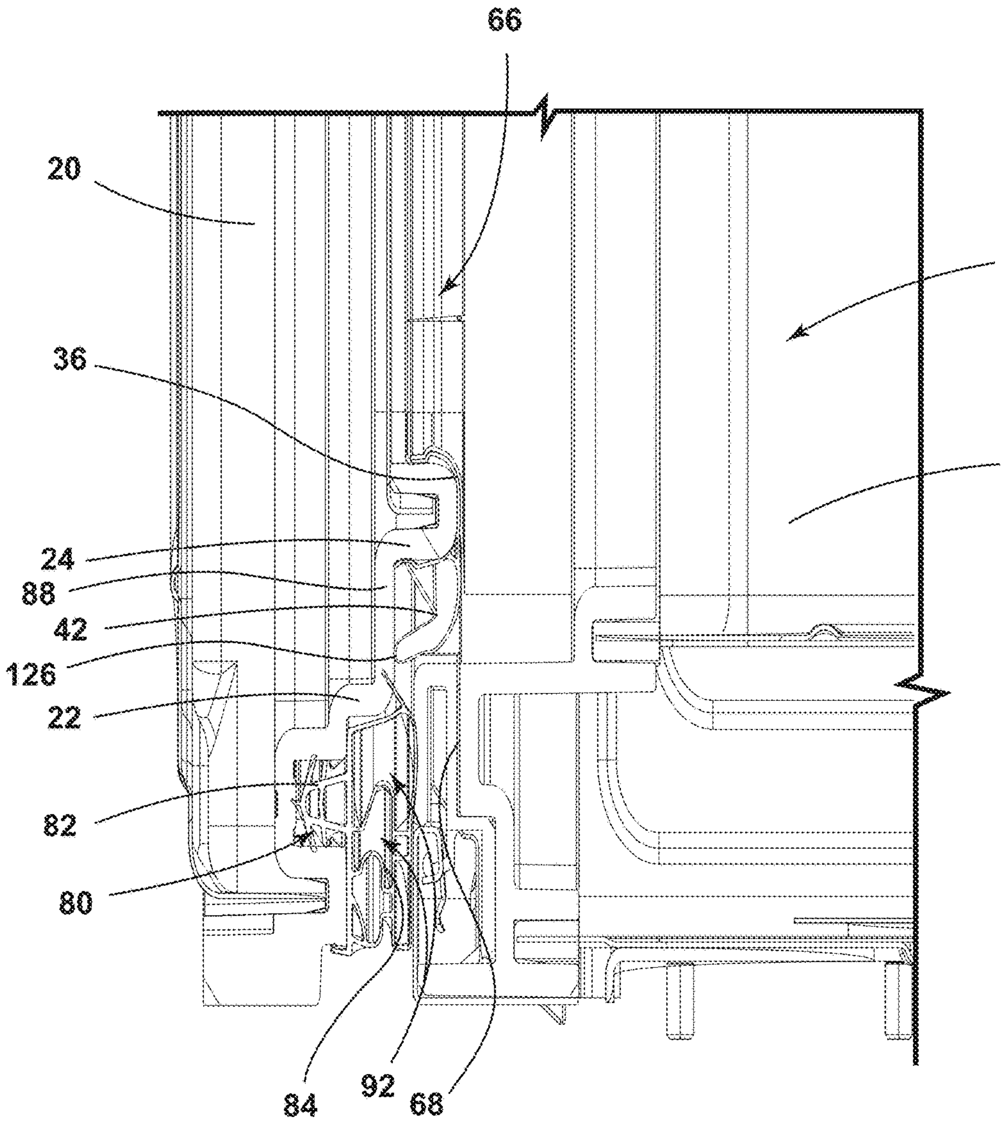
FIG. 8B is an enlarged view of area VIIIB of FIG. 3 and illustrates a lower portion of the gasket assembly of the lower door.

Referring still to FIGS. 5 and 6, the door trim breaker 22 further includes a raised portion 88 configured to be received by the compartment opening 66 (FIGS. 8A and 8B). The engagement member 24 extends from the raised portion 88 away from the door liner 74 and parallel to the exterior gasket 70. The engagement member 24 may extend about the entire of the periphery of the door 20 or a portion of the periphery of the door 20. The engagement member 24 may be a single member along its length, as illustrated, or may be a plurality of engagement members 24 interspaced along the periphery of the door trim breaker 22 without departing from the scope of the present disclosure.

The engagement member 24 includes first and second opposing sides 28, 32 joined by a top wall 90. The first side 28 is positioned proximate to the exterior gasket 70 such that the interior gasket 34 is positioned interior of the exterior gasket 70. The engagement member 24 is positioned to be at least partially received by the freezer compartment opening 66 when the freezer compartment door 20 is closed. In various examples, the engagement member 24 may be beveled where the top wall 90 meets the first and second sides 28, 32 of the engagement member 24.

As illustrated in FIG. 5, the engagement member 24 may define the slot 76 opposite the top wall 90 of the engagement member 24. The slot 76 is configured to receive the edge 78 of the inner door liner 74 such that the second side 32 of the engagement member is parallel with the edge 78 of the inner door liner 74 and is perpendicular with the body 72 of the inner door liner 74.

With continued reference to FIGS. 5 and 6, the first side 28 of the engagement member 24 includes the first retention ridge 26, and the second side 32 of the engagement member 24 includes the second retention ridge 30. The first retention ridge 26 extends from the first side 28 of the engagement member 24 toward the exterior gasket 70, and the second retention ridge 30 extends from the second side 32 of the engagement member 24 toward the center of the freezer compartment door 20. Each of the first and second retention ridges 26, 30 may be generally curved and may be configured to snap-engage with the interior gasket 34, as described in more detail elsewhere herein.

The first retention ridge 26 is positioned a first distance D1 from the top wall 90 of the engagement member 24, and the second retention ridge 30 is positioned a second distance D2 from the top wall 90 of the engagement member 24. As illustrated, the first distance D1 is greater than the second distance D2 such that the first retention ridge 26 is positioned further from the top wall 90 than the second retention ridge 30. This offsets the first and second retention ridges 26, 30 to form a poka-yoke feature to guide installation of the interior gasket 34.

Referring still to FIGS. 5 and 6, the secondary gasket 34 is configured to be positioned over the engagement member 24 of the door trim breaker 22 to couple the interior gasket 34 with the door trim breaker 22 and, subsequently, to couple the interior gasket 34 with the freezer compartment door 20. As illustrated in detail in FIG. 7, the interior gasket 34 includes the coupling portion 36 configured to couple with the engagement member 24 (FIGS. 5 and 6) and the contact portion 42 extending from the coupling portion 36. As illustrated in FIGS. 8A and 8B, and discussed in more detail elsewhere herein, the contact portion 42 is configured to at least partially abut the freezer compartment trim breaker 68 to provide a secondary seal when the freezer compartment door 20 is closed.

Figure 7:
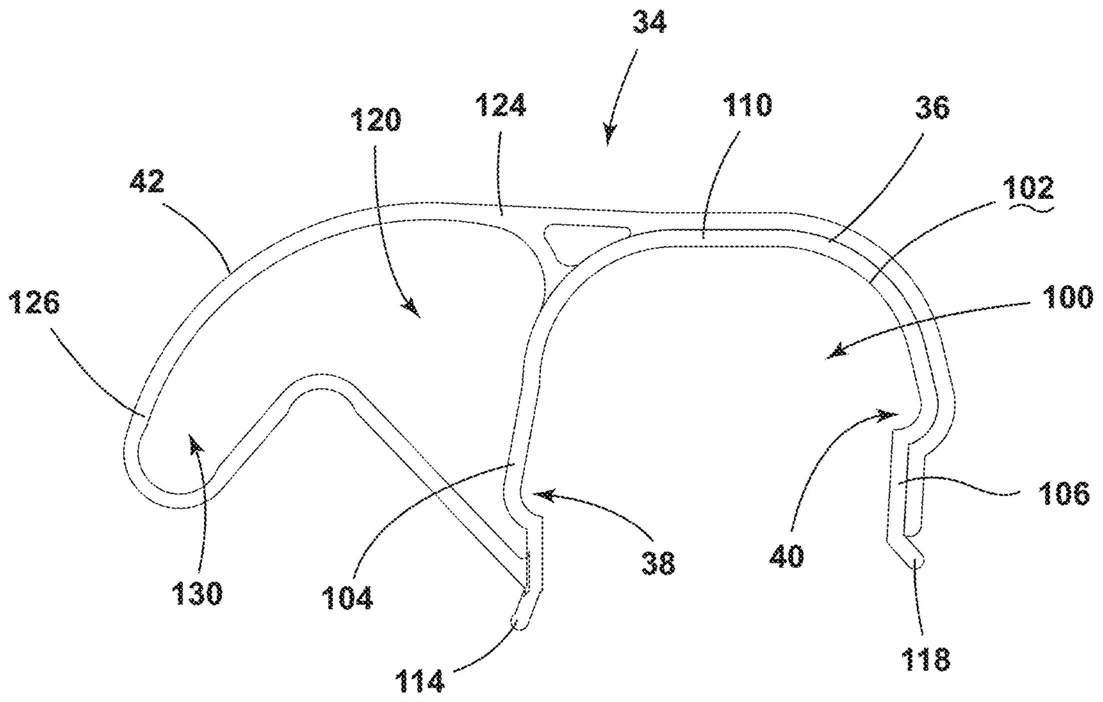
FIG. 7 is a cross-sectional view of the gasket of FIG. 5.

Referring now to FIGS. 5-7, the coupling portion 36 of the interior gasket 34 is shaped to complement and receive the engagement member 24. As best shown in FIG. 7, the coupling portion 36 defines a receiving channel 100 configured to receive the engagement member 24 such that, when the engagement member 24 is positioned within the receiving channel 100, an inner surface 102 of the coupling portion 36 is in substantially continuous contact with the engagement member 24. The coupling portion 36 of the interior gasket 34 may be formed of a rigid material such as, for example, a rigid PVC. The rigid material may prevent inadvertent uncoupling of the interior gasket 34 from the engagement member 24.

The coupling portion 36 of the interior gasket 34 is configured to snap-engage with the engagement member 24, as illustrated in FIG. 5. As illustrated in detail in FIG. 7, the coupling portion 36 includes a first leg 104 and a second leg 106 configured to fit over each of the first and second retention ridges 26, 30 (FIG. 5). The first leg 104 defines a first retention space 38, and the second leg 106 of the coupling portion 36 defines a second retention space 40. Each of the first and second retention spaces 38, 40 are in communication with the receiving channel 100. The first retention space 38 is configured to snap-engage with and receive the first retention ridge 26 of the engagement member 24, and the second retention space 40 is configured to snap-engage with and receive the second retention ridge 30 of the engagement member 24 (FIG. 5).

Referring again to FIGS. 5-7, the positioning of the first and second retention spaces 38, 40 along the first and second legs 104, 106 of the coupling portion 36 is configured to accommodate and match the offset of the first and second retention ridges 26, 30. For example, the first retention space 38 is defined to be spaced a third distance D3 from a top wall 110 of the coupling portion 36. The third distance D3 is configured to complement the first distance D1 between the top wall 90 of the engagement member 24 and the first retention ridge 26. The second retention space 40 is defined to be spaced a fourth distance D4 from the top wall 110 of the coupling portion 36, and the fourth distance D4 is configured to complement the second distance D2 between the top wall 90 of the engagement member 24 and the second retention ridge 30.

As shown in FIGS. 6 and 7, to facilitate snap-engaging the coupling portion 36 over the engagement member 24, a first foot 114 extends from the first leg 104 and is angled outward from the first leg 104. The angle of the first foot 114 allows the first leg 104 to snap over the first retention ridge 26 when the interior gasket 34 is coupled with the engagement member 24. A second foot 118 extends from the second leg 106 and is angled outward from the second leg 106 in a direction opposite the first foot 114. The angle of the second foot 118 allows the second leg 106 to snap over the second retention ridge 30 when the interior gasket 34 is coupled with the engagement member 24.

As best shown in FIG. 7, the contact portion 42 of the interior gasket 34 is integrally formed with the coupling portion 36 and is formed of a compressible and/or flexible material such as, for example, a flexible polyvinyl chloride (PVC). In various examples, the contact portion 42 may extend over the coupling portion 36 and extend from the first leg 104 of the coupling portion 36 to the second leg 106 of the coupling portion 36. The coupling portion 36 defines a compressible space 120 extending from the first side 28 of the engagement member 24 when the interior gasket 34 is coupled with the engagement member 24.

The contact portion 42 of the interior gasket 34 includes a base section 124 proximate the coupling portion 36 and an extension section 126 integrally formed with and extending from the base section 124. The extension section 126 may extend from the base section 124 at an angle and/or may be generally arcuate. The extension section 126 defines an extension space 130 in communication with the compressible space 120 of the contact portion 42. The extension section 126 is shaped and positioned to at least partially abut the freezer compartment trim breaker 68 when the freezer compartment door 20 is closed, as illustrated in FIGS. 8A and 8B.

As illustrated in FIGS. 8A and 8B, when the freezer compartment door 20 is closed, all or a portion of the compressible portion 84 of the exterior gasket 70 contacts the freezer compartment trim breaker 68. This contact forms a primary seal for the freezer compartment door 20. In various examples, the compressible portion 84 may include a magnet assembly 140 configured to retain the freezer compartment door 20 when the freezer compartment door 20 is closed. The exterior gasket 70 may be configured to extend about the entire exterior periphery of the door 20 or may extend only partially about the periphery of the door 20 without departing from the scope of the present disclosure.

When the freezer compartment door 20 is closed, the raised portion 88 of the door trim breaker 22 is received by the freezer compartment opening 66. The engagement member 24 of the door trim breaker 22 and the interior gasket 34 are at least partially received by the freezer compartment opening 66 proximate the freezer compartment trim breaker 68 such that at least the extension section 126 of the contact portion 42 abuts the freezer compartment trim breaker 68. The contact between the extension section 126 and the freezer compartment trim breaker 68 is configured to provide a secondary seal for the freezer compartment door 20.

Referring again to FIGS. 1-8B, the interior gasket 34 is coupled with the engagement member 24 of the door trim breaker 22 to provide the secondary seal for the freezer compartment door 20 when the freezer compartment door 20 is closed. The secondary seal may provide additional sealing for the door 20 which may improve the seal between the freezer compartment door 20 and the freezer compartment 16. Additionally, the poka-yoke feature provided by the first and second retention ridges 26, 30 and the first and second retention spaces 38, 40 may provide for easier installation of the interior gasket 34.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term “coupled” (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A refrigerator appliance comprising:

a cabinet defining a compartment;

a door hingedly coupled with the cabinet and configured to selectively seal the compartment, wherein the door includes a door trim breaker;

an engagement member extending from the door trim breaker to a top wall and having a first retention ridge extending from a first side of the engagement member and a second retention ridge extending from a second side of the engagement member that is opposite the first side of the engagement member, wherein the first retention ridge is offset from the second retention ridge such that the first retention ridge is located further from the top wall than the second retention ridge; and an interior gasket configured to fit over the engagement member, wherein the interior gasket includes:

a coupling portion defining a first retention space and a second retention space extending in an opposite direction from the first retention space, wherein the first retention space is configured to receive the first retention ridge and the second retention space is configured to receive the second retention ridge; and a contact portion integrally formed with the coupling portion and configured to at least partially abut the cabinet when the door is closed.

2. The refrigerator appliance of claim 1, further comprising:

a door liner coupled with the door trim breaker, wherein the door liner extends within the engagement member towards the top wall to an edge positioned perpendicular to a body of the door liner.

3. The refrigerator appliance of claim 2, wherein the door trim breaker defines a slot configured to receive the edge of the door liner.

4. The refrigerator appliance of claim 1, wherein the compartment is accessible by a compartment opening, and further wherein the compartment opening is defined by a compartment trim breaker.

5. The refrigerator appliance of claim 4, wherein the contact portion abuts the compartment trim breaker when the door is closed.

6. The refrigerator appliance of claim 4, wherein the engagement member is at least partially received by the compartment opening when the door is closed.

7. The refrigerator appliance of claim 1, wherein the contact portion includes an extension section integrally formed with and extending from a base section to define an enclosed extension space, and further wherein the base section is integrally formed with the coupling portion.

8. A refrigerator appliance comprising:

a cabinet defining a compartment, wherein the compartment is accessible by a compartment opening, and wherein the compartment opening is defined by a compartment trim breaker;

a door configured to selectively seal the compartment, wherein the door includes a door trim breaker operably coupled with a door liner;

an engagement member extending from the door trim breaker to a top wall and having a first retention ridge extending from a first side of the engagement member and a second retention ridge extending from a second side of the engagement member, wherein the first retention ridge is offset from the second retention ridge such that the first retention ridge is located further from the top wall than the second retention ridge;

an exterior gasket operably coupled with the door trim breaker and configured to abut the compartment trim breaker when the door is closed; and an interior gasket configured to fit over the engagement member, wherein the interior gasket includes a coupling portion configured to snap-engage with both the first retention ridge and the second retention ridge of the engagement member and a contact portion integrally formed with the coupling portion.

9. The refrigerator appliance of claim 8, wherein the door trim breaker defines a gasket channel configured to receive an anchor of the exterior gasket to couple the exterior gasket with the door.

10. The refrigerator appliance of claim 8, wherein the interior gasket is positioned interior of the exterior gasket.

11. The refrigerator appliance of claim 8, wherein the coupling portion defines a first retention space configured to receive and snap-engage the first retention ridge and a second retention space configured to receive and snap-engage the second retention ridge.

12. The refrigerator appliance of claim 8, wherein the contact portion of the interior gasket at least partially abuts the compartment trim breaker when the door is closed.

13. The refrigerator appliance of claim 8, wherein the interior gasket and the engagement member are at least partially received by the compartment opening when the door is closed.

14. The refrigerator appliance of claim 8, wherein the exterior gasket includes a magnet assembly configured to bias the door closed.

15. A gasket assembly for an appliance door, comprising:

a door trim breaker defining a gasket channel and including an engagement member, wherein the engagement member includes a first retention ridge extending from a first side of the engagement member and a second retention ridge extending from a second side of the engagement member;

an exterior gasket including an anchor, wherein the anchor is positioned within the gasket channel and couples the exterior gasket with the door trim breaker; and an interior gasket including a coupling portion defining a receiving channel extending from a top wall to a pair of opposing outwardly extending angles that facilitate insertion of the engagement member, the coupling portion configured to snap-engage with the engagement member and a contact portion integrally formed with the coupling portion and extending toward the exterior gasket to an extension section, the extension section extending from the contact portion at an angle and defining an extension space, the contact portion defining an enclosed compressible space in communication with the extension space.

16. The gasket assembly of claim 15, wherein the engagement member is positioned on a raised portion of the door trim breaker.

17. The gasket assembly of claim 15, wherein the coupling portion is formed of a rigid material and the contact portion is formed of a flexible material.

18. The gasket assembly of claim 15, wherein the coupling portion includes a first leg defining a first retention space configured to receive the first retention ridge and a second leg defining a second retention space configured to receive the second retention ridge.

19. The gasket assembly of claim 18, wherein the first leg includes a first foot extending at a first outward angle of the pair of opposing outwardly extending angles from the first leg and the second leg includes a second foot extending at a second outward angle of the pair of opposing outwardly extending angles from the second leg, and wherein the first foot is offset from the second foot such that the first foot is further from the top wall than the second foot.

20. The gasket assembly of claim 15, wherein the first and second retention ridges are offset.

* * * * *